United States Patent [19]

Chalilpoyil et al.

[11] Patent Number: 4,585,716
[45] Date of Patent: Apr. 29, 1986

[54] CELL CORROSION REDUCTION

[75] Inventors: Purush Chalilpoyil, Lincoln, Mass.; Jesse R. Rea, Greenburgh, N.Y.; Frank E. Parsen, Weston; Chih-Chung Wang, Lexington, both of Mass.

[73] Assignee: Duracell Inc., Bethel, Conn.

[21] Appl. No.: 764,454

[22] Filed: Aug. 12, 1985

Related U.S. Application Data

[63] Continuation-in-part of Ser. No. 629,011, Jul. 9, 1984, abandoned.

[51] Int. Cl.$^4$ .................... H01M 4/08; H01M 4/26; H01M 4/42
[52] U.S. Cl. .................... 429/206; 29/623.1; 156/616 R; 252/182.1; 429/218; 429/230
[58] Field of Search ............ 429/229, 230, 231, 59, 429/50, 206, 218; 29/623.1; 252/182.1; 156/616 R

[56] References Cited

U.S. PATENT DOCUMENTS

| | | | |
|---|---|---|---|
| 1,393,739 | 10/1921 | Benner | 136/30 |
| 2,982,806 | 5/1961 | Voss | 136/30 |
| 3,764,389 | 10/1973 | Hsia et al. | 136/31 |
| 3,853,625 | 12/1974 | Louzos | 136/30 |

FOREIGN PATENT DOCUMENTS 2119404  11/1983  United Kingdom .

Primary Examiner—Donald L. Walton
Attorney, Agent, or Firm—Ronald S. Cornell; Israel Nissenbaum

[57] ABSTRACT

Corrosion is reduced in aqueous electrochemical cells having zinc anodes by utilizing mercury amalgamated discrete single crystal zinc particles to which small amounts of one or more of indium, thallium, gallium, bismuth, cadmium, tin and lead have been added or prealloyed with the zinc, prior to formation of the single crystal particles. A synergistically lowered rate of corrosion and cell gassing is obtained even with reduction of mercury content.

34 Claims, No Drawings

CELL CORROSION REDUCTION

This is a continuation-in-part of application U.S. Ser. No. 629,011 filed July 9, 1984, now abandoned.

This invention relates to methods utilized in the reduction of corrosion and gassing in aqueous electrochemical cells particularly in alkaline type cells having zinc anodes.

A problem in aqueous electrochemical cells has been the evolution of hydrogen gas in the sealed cell container. Such gassing has resulted in corrosion, leakage of the electrolyte from the cell, cell container deformation and rupture, and a possible hazard when the cell is disposed of in a fire. Various expedients have been utilized in preventing, minimizing and controlling such hydrogen gas evolution and its consequences. Such expedients have included mechanical means such as vents and additional volume for storing the hydrogen without excessive pressure build up. Chemical expedients have included: corrosion and gassing inhibitors such as lead, indium, tin, cadmium, bismuth, thallium, and gallium; hydrogen getters such as rare metals supported on oxides such as platinum supported on aluminum oxide or palladium or finely dispersed nickel mixed with polytetrafluoroethylene and manganese dioxide, and hydrides such as LaNiH; hydrogen recombination with oxygen particularly utilized in nickel cadmium cells; and removal of chemicals such as chlorides from the surface of the anode metal which tend to accelerate corrosion. The most common, most effective and the oldest expedient (particularly in alkaline electrolyte cells) has been the utilization of mercury to amalgamate the anode metal such as zinc to increase the normally high hydrogen overpotential and to provide for a uniform equipotential surface on the anode metal. Recently, with the increase of environmental concerns, reduction or elimination of mercury without substantial concomitant increase in cell corrosion or gassing has been vigorously pursued. For example, in U.S. Pat. No. 4,487,651 assigned to the same assignee as the present invention, the amount of mercury utilized for protective amalgamation of zinc anodes is disclosed as being reduced from about 7% to about 4% by the use of single crystal zinc particles without ill effect, i.e. without increase in gassing.

It is an object of the present invention to provide a means for reduction or elimination of mercury in cell anodes without loss of corrosion protection and increase in cell gassing.

This and other objects, features and advantages of the present invention will become more evident from the following discussion.

Generally the present invention comprises a method for making an electrochemical cell subject to reduced gassing by means of utilization of specific materials in specific states; such materials and the cell itself. The method is particularly applicable to a cell having an anode comprised of a mercury amalgamated powdered metal such as zinc. In the method of the present invention the powdered metal is substantially formed into individual discrete single crystal particles and a small amount of one or more of indium, cadmium, gallium, thallium, bismuth, tin, and lead is added to the anodic material i.e. the powdered metal (amalgamated or unamalgamated) or to mercury which is then amalgamated with the powdered metal. The mercury and the additive, in this latter procedure, generally form a surface alloy on each of the particles. Alternatively, the powdered anode material, such as zinc, is prealloyed with a small amount of one or more of indium, cadmium, gallium, thallium, bismuth, tin, and lead and then formed into the individual discrete single crystal particles which are thereafter amalgamated with mercury.

Though the use of indium and/or other additives has been known to effectively permit some reduction of mercury content in polycrystalline metal anodes without detrimental increase in gassing, the effect of utilizing single crystal metal anodes with contained indium or other additives is significantly greater. The utilization of an indium additive with polycrystalline zinc amalgam anodes permits the reduction of mercury from about 6–7% to about 3.5%. However, in accordance with the present invention, the use of a single crystal zinc amalgam with an indium additive or a single crystal alloy of the zinc with indium and/or other additives unexpectedly permits the effective reduction of the mercury to about 1.5%.

The single crystals of zinc or of the zinc alloy are preferably prepared by the method disclosed in the aforementioned U.S. Pat. No. 4,487,651 (the disclosure of which is incorporated herein by reference thereto) and comprises initially forming a thin skin crucible on each of the zinc or zinc alloy particles by oxidation in air at a temperature just below the melting point (419° C.) of the zinc or zinc alloy (somewhat different oxidation temperature depending upon the alloy formed and its melting point), heating of the oxide-skin enclosed zinc or zinc alloy particles in an inert atmosphere above the melting point of the zinc or zinc alloy and slow cooling thereafter with removal of the oxide skins. Anode metal particle sizes generally range between 80 and 600 microns for utility in electrochemical cells and such method provides an effective means for making single crystal particles of such small dimensions. Such particles are discrete individual single crystals which is to be differentiated both physically and electrochemically from the electrodeposited needles and fibers described in U.S. Pat. Nos. 3,853,625 and 3,844,838 wherein each of the needles or fibers is comprised of one or more single crystals as a spine and polycrystalline poly-directional side growths.

Generally the amounts of indium or other additive added to the anode metal or anode metal amalgam or originally alloyed with the anode metal prior to formation of the single crystals may range between 25–5000 ppm and preferably between 100–1000 ppm. Such material may be directly added to the mercury itself. For example indium is highly soluble in mercury and can be directly added thereto in the form of powder or granules. Alternatively, the additive may be plated on the surface of the anode metal from salts of the additive prior to amalgamation with mercury. Such salts include the halides, particularly chlorides, oxides and acetates of the materials such as indium. It has been discovered that the additives such as indium whether by addition to the mercury or by plating on the single crystal anode metal particles do not in fact disrupt the single crystal nature thereof to any detrimental extent as may have been expected. In fact it has been discovered that the additives may form part of the single crystal as a prealloyed anode metal-additive material. The single crystal components of the fibers or needles of said U.S. Pat. Nos. 3,853,625 and 3,844,838 cannot, by their described method of formation by electrodeposition, be an alloy, since only one metal is electrodeposited and such metal is described as being exceedingly pure.

The amount of mercury in the anode amalgam may range from 0-4% depending upon the cell utilization and the degree of gassing to be tolerated.

The amalgamated single crystal metal particles with additives or prealloyed inclusions of materials such as indium are then formed into anodes for electrochemical cells particularly alkaline electrochemical cells. Such cells generally have anodes of zinc and cathodes of materials such as manganese dioxide, silver oxide, mercuric oxide and the like. Electrolytes in such cells are generally alkaline and usually comprise hydroxide solutions such as of sodium or potassium hydroxide. Other anode metals capable of being formed into single crystal powders and which are useful in electrochemical cells include Al, Cd, Ca, Cu, Pb, Mg, Ni, and Sn. It is understood that with anodes of these metals the additive is not the same as the anode active material but is less electrochemically active.

The effects of the present invention can be more clearly evidenced by consideration of comparative gassing rates and discharge capacities as shown in the following examples. It is understood that such examples are for illustrative purposes and are not to be construed as a limitation on the present invention. In the examples as well as throughout this discussion all parts are parts by weight unless otherwise indicated.

EXAMPLE 1

Zinc powder amalgams containing 1.5% mercury are made with polycrystalline zinc alone, polycrystalline zinc with 0.1% indium as an additive element with the mercury, single crystal zinc, and single crystal zinc with 0.1% indium as an additive element with the mercury. Equal amounts of the amalgam powders are then placed in equal amounts of 37% KOH alkaline solution (typical electrolyte solution of alkaline cells) and tested for gassing at a temperature of 71° C. The amount of gassing, measured in microliters/gram per day (uL/g-day) and the rate reduction factors (with the polycrystalline zinc control being 1) are set forth in Table 1:

TABLE 1

| ANODE MATERIAL | GASSING RATE | RATE REDUCTION FACTOR |
|---|---|---|
| Polycrystalline zinc, 1.5% Hg | 295 | 1 |
| Polycrystalline zinc, 1.5% Hg 0.1% indium | 105 | 2.8 |
| Single crystal zinc, 1.5% Hg | 140 | 2.1 |
| Single crystal zinc, 1.5% Hg 0.1% indium | 30 | 9.8 |

A rate reduction factor (if any) would at most have been expected to be about 5.9 (2.8×2.1) for a combined utilization of single crystal zinc and indium with a gassing rate reduction to about 50 uL/g-day. The combination however synergistically reduces the gassing to about double the expected reduction.

EXAMPLE 2

Fifteen amalgams of single crystal zinc particles with various combinations of additive materials of indium, thallium, gallium and lead are prepared and tested for corrosion. The additive materials are plated on the zinc particles from salts thereof. All the amalgams contain 1.5% by weight of mercury. The amounts of each of the additive materials (designated by "+" and "−" if not present) are 0.1% indium (In), 0.05% thallium (Tl), 0.01% gallium (Ga), and 0.04% lead (Pb). Two grams of each of the amalgams are placed in a 37% KOH electrolyte solution with gassing at the end of 24 and 48 hours being measured at 90° C. as being representative of corrosion. As controls two amalgams are made with one containing no additive material but with 1.5% mercury and the other containing polycrystalline zinc with 7% mercury similar to that commonly used in alkaline type cells. Results of such tests are given in Table 2.

TABLE 2

| ADDITIVE ELEMENT | | | | VOLUME OF GAS (mL), 90°C. | |
|---|---|---|---|---|---|
| In | Tl | Ga | Pb | 24 Hours | 48 Hours |
| + | − | − | − | 0.17 | 0.51 |
| − | + | − | − | 0.13 | 0.49 |
| − | − | + | − | 0.42 | 1.35 |
| − | − | − | + | 0.40 | 1.15 |
| + | + | − | − | 0.13 | 0.36 |
| + | − | + | − | 0.17 | 0.47 |
| + | − | − | + | 0.15 | 0.42 |
| − | + | + | − | 0.12 | 0.40 |
| − | + | − | + | 0.12 | 0.56 |
| − | − | + | + | 0.40 | 1.13 |
| + | + | + | − | 0.13 | 0.42 |
| + | + | − | + | 0.11 | 0.32 |
| − | + | + | + | 0.15 | 0.60 |
| + | − | + | + | 0.14 | 0.44 |
| + | + | + | + | 0.10 | 0.28 |
| − | − | − | − (control) | 0.41 | 1.39 |
| Control 7% Hg—polycrystalline Zn | | | | 0.16 | 0.43 |

Indium and/or thallium as shown in the above table provide the most efficacious reduction of gassing and are thus preferred embodiments of the present invention. However increase in percentage of gallium or lead is expected to provide similar effects. Other materials similar in effect to indium such as cadmium, tin and bismuth may be similarly expected to provide the enhanced effect of the present invention.

EXAMPLE 3

Seven zinc amalgams containing 1.5% Hg are prepared with three being comprised of single crystal zinc (made as described above) and four being comprised of polycrystalline zinc. The amalgams containing single crystal zinc comprise two having 0.1% indium (one added to the mercury prior to amalgamation and the other being plated on the zinc particle surfaces prior to amalgamation) and one having no indium. The polycrystalline zinc amalgams include three without lead for direct comparison with the single crystal zinc which contains no lead and one polycrystalline amalgam with lead as commonly utilized in electrochemical cells. The lead free polycrystalline amalgams are directly analagous to the three single crystal zinc amalgams. The polycrystalline leaded zinc amalgam contains 0.02% indium. A control of polycrystalline zinc with lead and 7% mercury (as commonly utilized in alkaline cells) is also prepared. Two gram samples of each of the above amalgams are tested for gassing at elevated temperatures (71° C. and 90° C.) for varying time periods with total gas volume and gassing rates being comparatively determined as set forth in Table 3 below.

EXAMPLE 4

Cells are made with the amalgams described in Example 3 of single crystal zinc with 0.1% indium (both types), polycrystalline zinc with 0.1% indium plated on the zinc particles, polycrystalline zinc with 0.02% indium added to the mercury, and a control of polycrystalline zinc with no indium and 7% mercury (a typical alkaline cell). Each of the cells of AA standard size contains a 2.7 gram anode (1.75% starch graft copolymer gelling agent), 2.6 grams of a 37% KOH electrolyte and a manganese dioxide cathode with the cell being anode limited. Five cells are tested for gassing for varying periods at 71° C. without discharge and five are similarly tested but after partial discharge at 3.9 ohm for one hour. Total gas volume and gassing rates are set forth in Table 3 below.

EXAMPLE 5

Cells are made as in Example 4 and are each discharged to various cutoff-voltages with a 3.9 ohm load with the capacities in service hours set forth in Table 4 below.

TABLE 4

(Discharge Characteristics)
(Service Hours at 3.9 ohms)

| CUT-OFF VOLTAGES | SINGLE CRYSTAL ZINC | | POLYCRYSTALLINE ZINC | | |
|---|---|---|---|---|---|
| | 0.1% In + 1.5% Hg | 0.1% In in 1.5% Hg | 0.02% In 1.5% Hg | 0.1% In + 1.5% Hg | No In 7% Hg Ctrl |
| 1.2 | 0.660 | 0.668 | 0.533 | 0.688 | 0.623 |
| 1.1 | 1.616 | 1.638 | 1.457 | 1.712 | 1.553 |
| 1.0 | 2.826 | 2.859 | 2.480 | 2.926 | 2.598 |
| 0.9 | 3.535 | 3.652 | 3.235 | 3.619 | 3.295 |
| 0.8 | 3.800 | 3.967 | 3.498 | 3.883 | 3.599 |
| 0.65 | 3.986 | 4.179 | 3.594 | 4.020 | 3.684 |

EXAMPLE 6

Polycrystalline zinc is prealloyed with 550 ppm of gallium and 100 ppm of indium. A first sample thereof is then amalgamated with 1.5% mercury. A second sam-

TABLE 3

(GASSING)

| | SINGLE CRYSTAL ZINC | | | POLYCRYSTALLINE ZINC (No Pb) | | | POLYCRYSTALLINE ZINC (With Pb) | |
|---|---|---|---|---|---|---|---|---|
| | No Indium 1.5% Hg | 0.1% Indium in 1.5% Hg | 0.1% Indium +1.5% Hg | No Indium 1.5% Hg | 0.1% Indium in 1.5% Hg | 0.1% Indium +1.5% Hg | 0.02% Indium 1.5% Hg | No Indium 7% Hg Control |
| GAS VOLUME mL/2 g AMALGAM (OUT-OF-CELL) | | | | | | | | |
| DAYS (71° C.) | | | | | | | | |
| 7 | 1.55 | 0.44 | 0.41 | 4.10 | 1.50 | 1.45 | 1.21 | 0.49 |
| 14 | 3.52 | 0.95 | 0.98 | 7.73 | 2.52 | 2.68 | 2.49 | 0.92 |
| 21 | 5.88 | 1.57 | 1.70 | — | 3.60 | 3.96 | 3.91 | 1.42 |
| 28 | 7.75 | 2.25 | 2.36 | — | 4.64 | 5.11 | 5.29 | 1.96 |
| IN-CELL (UNDISCHARGED) | | | | | | | | |
| 0 | — | 0.17 | 0.19 | — | — | — | 0.29 | 0.28 |
| 7 | — | 0.48 | 0.37 | — | — | 0.40 | 0.78 | 0.37 |
| 14 | — | 0.56 | 0.58 | — | — | 0.76 | 0.94 | 0.47 |
| 28 | — | 0.92 | 0.94 | — | — | 1.00 | 1.28 | 0.71 |
| IN-CELL (DISCHARGED AT 3.9 OHM FOR ONE HOUR) | | | | | | | | |
| 0 | — | 0.21 | 0.18 | — | — | 0.28 | 0.23 | 0.18 |
| 7 | — | 0.31 | 0.30 | — | — | 0.60 | 0.91 | 0.39 |
| 14 | — | 0.43 | 0.42 | — | — | 1.02 | 1.25 | 0.49 |
| 28 | — | 1.01 | 0.98 | — | — | 2.53 | 4.37 | 1.00 |
| HOURS AT 90° C. (OUT-OF-CELL) | | | | | | | | |
| 24 | 0.53 | 0.20 | 0.20 | 1.89 | 0.47 | 0.60 | 0.50 | 0.17 |
| 48 | 1.88 | 0.68 | 0.69 | 4.73 | 1.21 | 1.49 | 1.20 | 0.56 |
| GASSING RATE uL/g-day (OUT-OF-CELL) | | | | | | | | |
| DAYS (71° C.) | | | | | | | | |
| 0-7 | 111 | 31 | 29 | 293 | 107 | 104 | 86 | 35 |
| 7-14 | 141 | 36 | 41 | 259 | 73 | 88 | 91 | 31 |
| 14-21 | 169 | 44 | 51 | — | 77 | 91 | 101 | 36 |
| 21-28 | 133 | 49 | 47 | — | 74 | 82 | 99 | 39 |
| 0-14 | 126 | 34 | 35 | 276 | 90 | 96 | 89 | 33 |
| 14-28 | 151 | 46 | 49 | — | 76 | 87 | 100 | 37 |
| 0-28 | 138 | 40 | 42 | — | 83 | 91 | 94 | 35 |
| IN-CELL (UNDISCHARGED) | | | | | | | | |
| 0-7 | — | 16 | 10 | — | — | 7 | 26 | 5 |
| 7-14 | — | 4 | 11 | — | — | 19 | 8 | 5 |
| 0-14 | — | 10 | 10 | — | — | 13 | 17 | 5 |
| 14-28 | — | 10 | 10 | — | — | 6 | 9 | 6 |
| 0-28 | — | 10 | 10 | — | — | 10 | 13 | 6 |
| IN-CELL (DISCHARGED AT 3.9 OHM FOR ONE HOUR) | | | | | | | | |
| 0-7 | — | 5 | 6 | — | — | 17 | 36 | 11 |
| 7-14 | — | 6 | 6 | — | — | 22 | 18 | 5 |
| 0-14 | — | 6 | 6 | — | — | 20 | 27 | 8 |
| 14-28 | — | 15 | 15 | — | — | 40 | 83 | 13 |
| 0-28 | — | 11 | 11 | — | — | 30 | 55 | 11 | ple is made into individual single crystal alloy particles, as described above, prior to the amalgamation with mercury. Two grams of each of the samples are placed in a 37% KOH electrolyte solution with gassing at the end of 24 and 48 hours being measured at 90° C. as being representative of corrosion. As control an amalgam is made with polycrystalline zinc with 7% mercury similar to that commonly used in alkaline type cells. Results of such tests are given in Table 5.

TABLE 5

| SAMPLE | VOLUME OF GAS (mL), 90'C. | |
|---|---|---|
|  | 24 Hours | 48 Hours |
| polycrystalline alloy | 0.7 | 1.9 |
| single crystal alloy | 0.3 | 1.0 |
| control (7% Hg) | 0.2 | 0.5 |

EXAMPLE 7

A first portion of polycrystalline zinc powder containing 0.04% lead is amalgmated with 2% Hg and a second portion is converted to individual single crystal particles prior to the amalgamation. The amalgams are then tested for corrosion rate in 10M KOH containing 2% ZnO. The gassing rates at 71° C. are 225 uL/gm per day and 80 mL/gm per day respectively.

It is evident that the corrosion reduction of anode metals such as zinc by the prealloying with corrosion reducing additive materials is greatly enhanced by the formation of single crystals from the anode metal-additive alloy.

It is further evident from the above examples and tables that the single crystal zinc with one or more additives of the present invention, whether as part of the single crystal structure or as an additive thereafter, is markedly effective in permitting large mercury reductions without significant increase in cell gassing while at the same time enhancing cell discharge characteristics when such cells are compared to the current commercial alkaline cells having high mercury amalgam content.

It is understood that the above examples are for illustrative purposes only and details contained therein are not to be construed as limitations on the present invention. Changes in cell construction, materials, ratios and the like may in fact be made without departing from the scope of the present invention as defined in the following claims.

What is claimed is:

1. An electrochemical cell comprising an anode, a cathode and an aqueous electrolyte characterized in that said anode is comprised of particles of discrete single crystals of anode metal and one or more members of the group consisting of indium, cadmium, gallium, thallium, bismuth, tin and lead, wherein said one or more members are present in said anode in a range of 25-5000 ppm.

2. The cell of claim 1 wherein said one or more members are alloyed with said anode metal, prior to formation of said discrete single crystal particles, whereby said one or more members form part of said single crystal.

3. The cell of claim 2 wherein said anode metal is zinc and said one or more members are selected from the group consisting of indium, gallium and lead and wherein said discrete single crystal particles are amalgamated with mercury in amounts of up to 4% by weight thereof.

4. The cell of claim 1 wherein said range is between 100-1000 ppm.

5. The cell of claim 1 wherein said anode further comprises mercury.

6. The cell of claim 5 wherein said anode is comprised of discrete single crystal anode metal particles and one or more members of the group consisting of indium, thallium, gallium and lead.

7. The cell of claim 6 wherein said anode is comprised of discrete single crystal anode metal particles and indium.

8. The cell of claim 6 wherein said anode metal is zinc.

9. The cell of claim 5 wherein said electrolyte is comprised of an alkaline solution.

10. The cell of claim 5 wherein said mercury is present in said anode in amounts of up to 4% by weight thereof.

11. The cell of claim 10 wherein said mercury is present in said anode in amounts of up to 1.5% by weight thereof.

12. A method for making an aqueous electrochemical cell subject to reduced gassing said method comprising the steps of making discrete individual single crystal particles of the metal utilized as the active anode of said cell, adding one or more additives selected from the group consisting of indium, cadmium, thallium, bismuth, tin and lead to said single crystal particles, and utilizing said single crystal particles with said one or more additives as the anode of said cell.

13. The method of claim 12 wherein said discrete individual single crystal particles with said one or more additives are amalgamated with mercury.

14. The method of claim 13 wherein said discrete individual single crystal metal particles are made by alloying polycrystalline zinc and one or more members of the group consisting of indium, cadmium, gallium, thallium, bismuth, tin and lead; forming individual thin oxide coatings on the polycrystalline zinc alloy particles by oxidation of said polycrystalline zinc alloy particles in air at a temperature below the melting point of said zinc alloy; heating of said zinc alloy particles in an inert atmosphere above the melting point of said zinc alloy; slow cooling of the zinc alloy particles and removal of said coatings.

15. The method of claim 12 wherein said discrete individual single crystal metal particles are made by forming individual thin oxide coatings on polycrystalline metal particles by oxidation of said polycrystalline metal particles in air at a temperature below the melting point of said metal, heating of said metal particles in an inert atmosphere above the melting point of said metal, slow cooling of the metal particles and removal of said coatings.

16. The method of claim 15 wherein said metal is zinc.

17. The method of claim 16 wherein said single crystal zinc particles with said one or more additives are amalgamated with mercury.

18. The method of claim 17 wherein said one or more additives comprise from 25-5000 ppm of said anode.

19. The method of claim 18 wherein said one or more additives comprise from 100-1000 ppm.

20. The method of claim 19 wherein said single crystal zinc particles are alloyed with one or more additives of the group consisting of indium, thallium, gallium and lead.

21. The method of claim 20 wherein said mercury is present in said anode in amounts of up to 4% by weight thereof.

22. The method of claim 21 wherein said mercury is present in said anode in amounts of up to 1.5% by weight thereof.

23. The method of claim 20 wherein said one or more additives are plated on said single crystal zinc particles prior to amalgamation of said particles with mercury.

24. The method of claim 20 wherein said one or more additives are admixed with said mercury prior to amalgamation of said single crystal zinc particles with said mercury.

25. A composition of matter suitable for use in making an anode of an aqueous electrochemical cell with reduced gassing, said composition comprising discrete individual single crystal metal particles and one or more members of the group consisting of indium, cadmium, gallium, thallium, bismuth, tin and lead, wherein said one or more members are present in said anode in a range of 25–5000 ppm.

26. The composition of matter of claim 25 wherein said discrete individual single crystal metal particles are amalgamated with mercury.

27. The composition of matter of claim 26 wherein said metal is zinc.

28. The composition of matter of claim 27 wherein said mercury is present in amounts up to 4% by weight thereof and said one or more members comprise from 100 to 1000 ppm of said composition.

29. The composition of matter of claim 28 wherein said one or more members are selected from the group consisting of indium, thallium, gallium and lead.

30. An electrochemical cell subject to reduced gassing comprising an aqueous alkaline electrolyte, a cathode and an anode comprised of mercury amalgamated single crystal zinc particles and indium with said mercury comprising up to 4% by weight of said anode and said indium comprising from 100 to 1000 ppm of said anode.

31. The cell of claim 30 wherein said mercury comprises up to 1.5% by weight of said anode, said cathode is comprised of manganese dioxide and said aqueous electrolyte is comprised of a potassium hydroxide solution.

32. The cell of claim 10 wherein said anode is comprised of single crystal zinc particles, mercury and lead.

33. The method of claim 21 wherein said anode is comprised of single crystal zinc particles, mercury and lead.

34. The composition of matter of claim 29 wherein said one or more members is lead.

* * * * *